Figure 1:
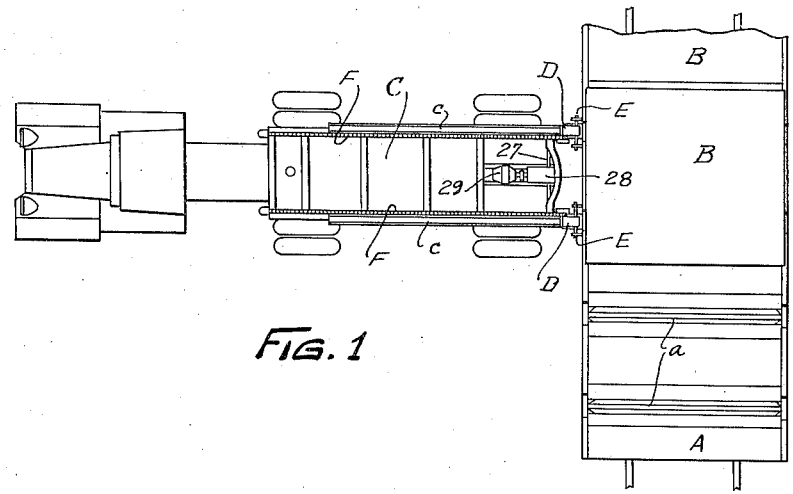

Aug. 16, 1938. R. A. NORBOM 2,126,800
APPARATUS FOR TRANSFERRING DEMOUNTABLE BODIES
Filed June 27, 1936 2 Sheets-Sheet 1

INVENTOR.
BY Ragnar A. Norbom,
ATTORNEYS.

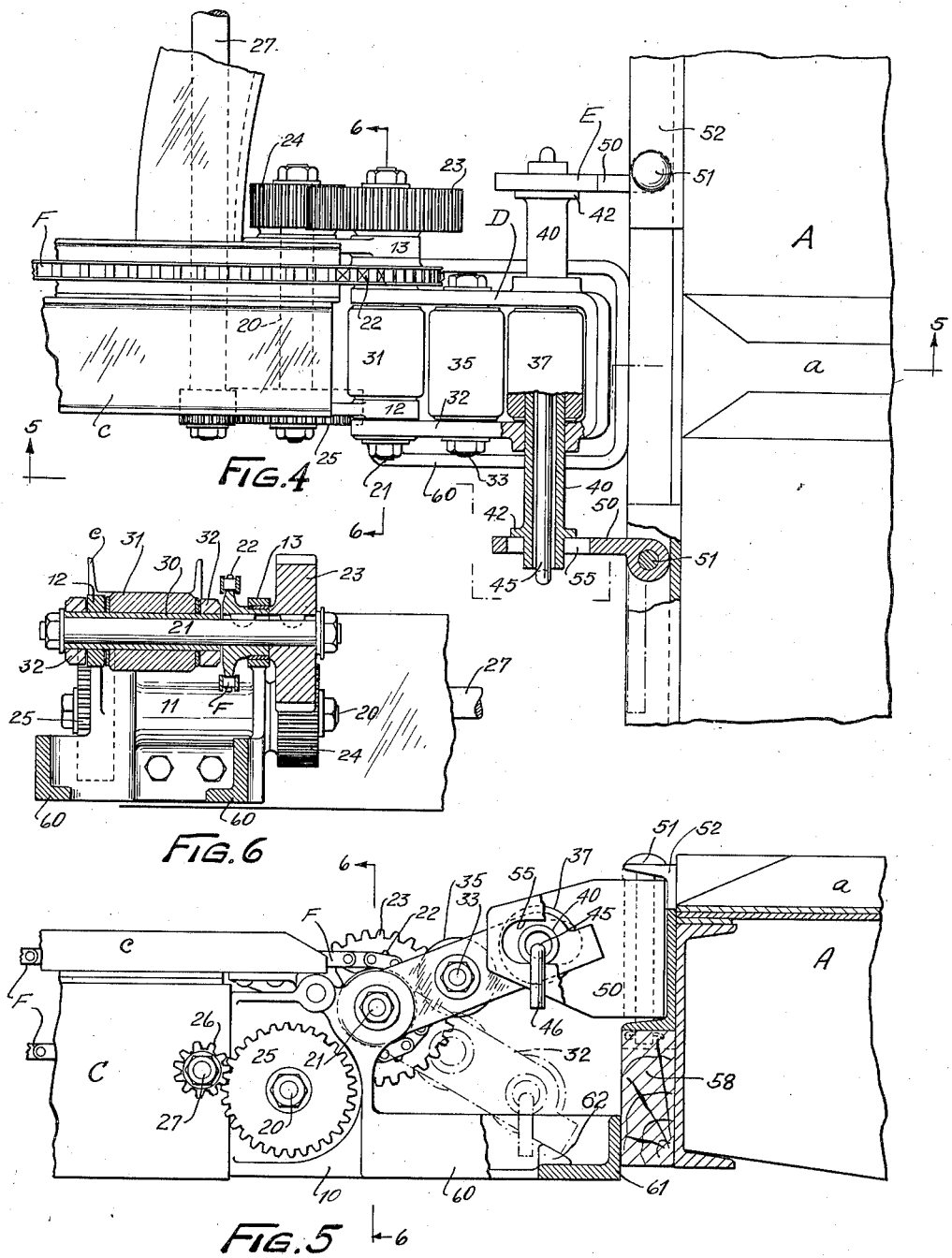

Patented Aug. 16, 1938

2,126,800

UNITED STATES PATENT OFFICE 2,126,800

APPARATUS FOR TRANSFERRING DEMOUNTABLE BODIES

Ragnar A. Norbom, Clifton, N. J., assignor to Motor Terminals Company, New York, N. Y., a corporation of Delaware Application June 27, 1936, Serial No. 87,649

21 Claims. (Cl. 214—38)

This invention relates to an apparatus for handling demountable freight containers, by means of a railway car and a highway truck equipped with mechanism for moving the container from either vehicle to the other. More particularly the invention is concerned with improvements in a highway truck of the type having longitudinal guideways for the demountable body, and chains parallel therewith for propelling the body to and from the truck, there being pivoted bridges at the rear end of the truck, which are adapted to be coupled to a side of a railway car so that the body may travel across the bridges from the car to the truck or vice versa.

It is an object of my invention to simplify the propelling mechanism and bridge construction on the truck, and to enable a more ready placement of the truck in registration with the car and coupling of the bridges to the car. Another feature of my invention is the provision of bumpers at the rear of the truck which serve the double purpose of protecting the bridges and insuring the truck being a proper distance when the truck has backed into a place.

My invention comprising the above outlined features and others contributing to the efficiency of the device is hereinafter more fully explained in connection with a preferred embodiment set out in the drawings.

Figure 2:
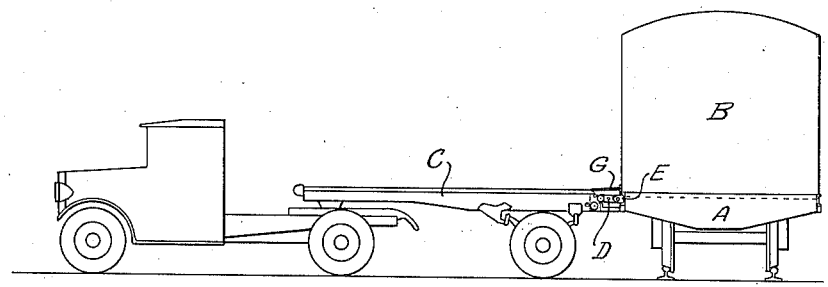
Figure 3:
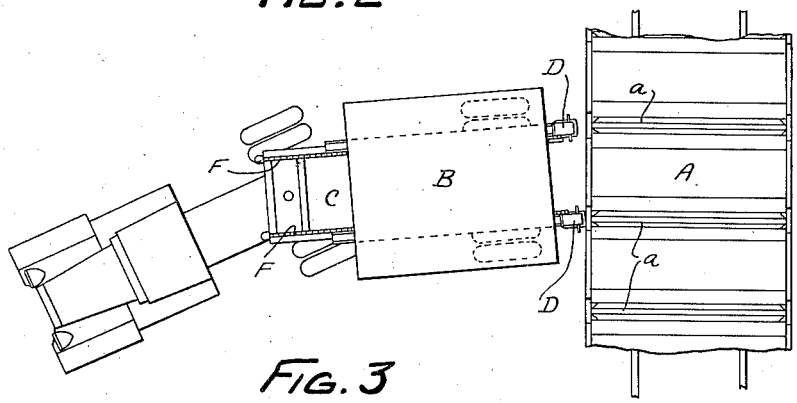

In the drawings, Fig. 1 is a plan of my improved truck, coupled to a railway car; Fig. 2 is a side elevation thereof; Fig. 3 is a plan illustrating the truck with its body as it is backing into place for attachment to the railway car; Fig. 4 is a sectional plan on a larger scale of the rear portion of the truck attached to the railway car; Fig. 5 is a sectional elevation of the parts shown in Fig. 4 on offset planes indicated by the line 5—5 on Fig. 4; Fig. 6 is a transverse vertical section along the axis of the shaft which forms the pivot of one of the bridges, as indicated by the lines 6—6 in Figs. 4 and 5.

In the drawings A indicates a suitable railway flat car equipped with transverse guiding channels $a$; B indicates demountable bodies which may be mounted on a flat car and carry on their bottoms parallel skid rails adapted to occupy the channels $a$. The highway truck C is shown as of the tractor-trailer type and has longitudinal channels $c$ adapted to register with channel $a$ on the car, and at the rear of the channels $c$ carries bridges D which are adapted to be attached to the car by a suitable connecting device E at the side of the car. The truck has endless propelling chains F the upper reaches of which extend parallel to the truck channels. Push and pull bars G are adapted to connect the body with the upper reaches of the chains which are propelled in one direction or the other by a suitable motor on the truck, and thus the body may be pulled from the railway car onto the truck or shoved from the truck onto the railway car.

The present invention is concerned primarily with the construction at the rear end of the truck, which coacts with the railway car and functions with relation to the propelling system in the truck. These features are best shown in Figs. 4, 5 and 6 and will now be described in detail.

Secured to the rear end of a truck at each side in longitudinal registration with the channels $c$ but below them are castings 10 which furnish bearings for the propelling shafts and protection for the pivoted bridges. Each casting is rigidly secured to the end porton of the truck and provides a bearing portion 11 (Fig. 6) for a shaft 20 and bearings 12 and 13 for a shaft 21. The shaft 21 carries a sprocket wheel 22 about which the propelling chain loops and carries a spur gear 23 meshing with a spur gear 24 on the shaft 20, and the latter shaft has a spur gear 25 meshing with a pinion 26 on a transverse shaft 27.

The shaft 27 extends across the truck and carries one of the pinions 26 at each end, it being understood that the construction shown in Figs. 4, 5 and 6 is repeated for the other side of the truck. The transverse shaft 27 is connected by reduction gearing (indicated at 28 in Fig. 1) to the motor 29. Accordingly the operation of this motor in one direction or the other moves the two chains in unison so that their upper reaches travel toward the front or rear as desired.

Freely surrounding the shaft 21 is a sleeve 30 on which is loosely journalled a roller 31. Beyond the ends of the roller are mounted the ends of a suitable U-shaped bail 32. This bail carries cross shafts 33 and 40 on which are mounted rollers 35 and 37. The bail with its three rollers, 31, 35 and 37 constitutes the pivoted bridge heretofore referred to under the designation D. In use the free end of this bridge is attached to the side of the car by means of the shaft 40 which extends in each direction well beyond the sides of the bridge and may operate as about to be explained.

To attach the free end of the bridge to the car, I prefer to employ the construction shown and described in application Serial No. 32,131 of Benjamin F. Fitch. As set out in that application, and as here illustrated in Figs. 4 and 5 there are pivoted to the side of the car a pair of wings 50 mounted on vertical hinged pintles 51, which are shown as being carried in the flanges of a channel beam 52 on the car side. Each of these wings has a horizontal slot 55. When the wings are swung outwardly they are adapted to stand at about right angles to the car side and receive the ends of the bridge shaft 40. This shaft carries collars 42 limiting the approach of the wings toward each other.

To hold the shaft 40 in engagement with the wings, the shaft 40 is made hollow and loosely carries a rod 45, having bent end portions 46. The bent ends are short enough to pass readily through slots 55 of the wings. Accordingly the wings may be swung over the ends of the shaft 40 until they abut the collars 42 and then the rod released so that its bent ends swing down into vertical position across the wings shown in Fig. 5 thereby preventing the wings passing off of the shaft 40.

To enable the ready placing of the truck at the proper distance from the car, as well as to prevent injury to the bridges when the truck abuts the car, I provide a pair of U-shaped bumpers 60, which are either a part of the casing 10 or rigidly secured to it. This bumper extends beyond the extreme end of the bridge and has a rear wall 61 which is adapted to engage a wooden bumper beam 58 on the car side when the truck is in position for the bridge to coact with the wings 50.

The bumpers also serve as means for carrying the free ends of the bridges during the travel of the truck. To this end the bumper may carry spaced lugs 62 in such position as to engage the underside of the intermediate portion of the bail 32 when the latter is in the idle position indicated by the broken lines in Fig. 5. This is the normal position of the operation of the truck as it travels the highways. It will readily be seen that the free ends are effectively supported and that they are also protected by the upstanding wall 61 of the bumper. At the same time the central region of the bail end is free so that it may be readily grasped by the operator in manually raising the bridge.

When the truck is to be attached it is only necessary for it to come into proper position with reference to the length of the car and then to back in until the bumper walls 61 engage the car side beams 58, and then, with the truck holding this position, the bridges may be manually raised, as necessary, to bring them in position to stand between the wings which are now turned outwardly to receive the ends of the tubular shaft 40. Suitable markings on the truckway may guide the truck so that it may readily back into place, substantially in registration with the car channels $a$ and approximately in alignment therewith, or if the registration is not satisfactory, the car may be readily moved in one direction or the other by the usual pinch bar.

While it is comparatively easy to select the region of the truck so that it will come into substantial registration with the car channels, difficulty has been found in having both sides of the truck standing at the same distance from the car. Frequently the truck comes in a position somewhat askew as illustrated in Fig. 3. Now, by my invention, this is well taken care of by reason of the bumpers 60. When the truck reaches the position of Fig. 3 and one of the bumpers has engaged the car, the bridge on that side may be attached and then a slight additional backing movement of the tractor will swing the trailer so that the other bumper comes into engagement with the car side, allowing the bridge from that side to be readily attached.

It will be seen, therefore, that the bumpers aid materially in causing alignment of the truck channels with the car channels in the simplest manner, and insure the aligned truck being at the proper distance from the car, and further protect the bridges against injury as it is impossible for the driver in backing to bring the bridges against the car side. Finally these bumpers furnish means for supporting the free ends of the bridges during transportation.

By providing a short bridge with only a few rollers in it, I make the bridge light enough so that it may be readily manipulated by one man, and I bring the sprocket wheels about which the chains loop near enough the overall rear end of the vehicle so that the push and pull bars without undue length may readily reach from a body on the car to a straight portion of the sprocket chain. I have accordingly simplified the construction, because the entire length of the roller bridge is so short that no power is needed on the bridge itself.

As I have shown my invention in Fig. 5, the bridge inclines upwardly from the truck to the railway in approximately the normal position when a loaded truck has been registered with an empty car. However as the heavily loaded body passes from the truck across the bridge onto the car, the adjacent edge of the car tips downwardly by the flexing of the car springs, and the rear end of the truck, as the body leaves it, rises somewhat, due to the reaction with its springs, so that as soon as the body becomes supported to a considerable extent by the car rather than by the truck, the two vehicles may come into approximately the same plane as indicated by Fig. 2. However, sufficient angular movement is possible for the bridge to provide for a wide variation in the elevation of the truck and car either at the time of coupling or during the transferring operation.

I claim:—

1. A truck adapted to carry a demountable body and provided with a hinged bridge, and a bumper carried by the truck and adapted to protect the bridge from blows and also to support it in an idle position during normal travel of the truck.

2. A truck adapted to carry a demountable body, a bridge pivoted to the truck at the rear end thereof and having a set of rollers adapted to co-operate with a guideway on the truck, the roller most distant from the truck being mounted on a shaft extending beyond the sides of the bridge and adapted to co-operate with an attaching device on a railway car, and a rigid bumper for supporting the free end of the bridge to hold the same extending in a diagonally downward direction during travel of the truck.

3. A truck adapted to carry a demountable body and provided with two guideways to receive skid rails on the body, said truck having pivoted bridges adjacent the ends of the guideways, each bridge comprising a U-shaped bail pivoted adjacent its free ends and rollers between the side arms of the bail.

4. A truck adapted to carry a demountable body having at the rear end thereof two bridges each in the form of a U-shaped bail pivoted to the truck adjacent the ends of the arms of the U, rollers carried by the bail between the arms, and bumpers carried by the truck adapted to protect the bail against blows and also support them during travel.

5. A truck adapted to carry a demountable body, said truck having a pair of longitudinal guideways, a pair of bridges at the rear end of the truck substantially registering with the guideways respectively, and a pair of bumpers secured to the truck and extending rearwardly and provided with an upstanding wall adapted to engage a car side with the extreme ends of the bridges a short distance away from such side.

6. A truck adapted to carry a demountable body and having a projecting bridge adapted to be attached at its free end to a support for the body to prevent outward movement of the truck, said truck having a bumper, combined with attaching means on the support so arranged that when the bumper on the truck engages the support, the free end of the bridge will be spaced at the proper distance from the support for ready engagement with the attaching device.

7. A highway truck having a pair of guideways and a pair of bridges pivotally secured to the truck and a pair of bumpers carried by the truck adjacent the bridges, combined with a platform having means at its side for attachment of the free ends of the bridges substantially in only one relative position of said means and ends, said means together with the bumper and bridges being so arranged that when the bumpers are in engagement with the edge of the platform, the bridges are positioned for cooperation with the attaching means by swinging the bridges on their pivots.

8. A highway truck having a pair of guideways extending lengthwise of the truck and a pair of bridges pivotally secured to the truck adjacent the rear ends of the guideways and a pair of bumpers carried by the truck directly below the bridges, combined with a railway car having means at its side for attachment of the free ends of the bridges, said means together with the bumper and bridges being so arranged that when the bumpers are in engagement with the car side, the ends of the bridges are properly spaced for cooperation with the attaching means by swinging the bridges on their pivots.

9. A truck having a pair of longitudinal guideways for the skid rails of a demountable body, bridges on the truck adjacent the ends of the guideways carrying rollers available for the skid rails of a body and a pair of bumpers on the truck beneath the respective bridges and supporting them in idle positions during truck travel, combined with a railway car having means for attaching the free ends of the bridges to the side of the car, the bumpers projecting such distance relative to the bridges that when the bumpers engage the side of the car, the bridges are thereby properly located relative to the attaching devices on the car.

10. A truck having a pair of guideways for the skid rails of a demountable body, said truck having a pair of bridges pivoted to it respectively adjacent the ends of the guideways, and a pair of bumpers adjacent the bridges adapted to support the bridges when extending diagonally downward, said bumpers projecting slightly farther than the bridges when horizontal, whereby when the bumper engages a vertical abutment the bridge is free to swing vertically past the abutment.

11. A truck adapted to carry a demountable body having at the rear end thereof a pair of spaced apart bumper castings, each casting carrying two shafts connected by spur gears, a pair of bridges pivoted to the rear pair of shafts respectively carried by said castings, a transverse shaft geared with the forward pair of shafts carried by said castings, and a motor geared with the transverse shaft.

12. A truck adapted to carry a demountable body, a bridge pivoted to the truck, a bumper carried by the truck vertically beneath the free end of the bridge adapted to support the bridge in a recumbent position during travel, combined with a structure adapted to support the body and having an attaching device adapted to be secured to the free end of the bridge, said bumper projecting such distance relative to the bridge that when the bumper engages the side of the supporting structure the bridge is thereby properly located relative to the attaching device.

13. A truck having a pair of longitudinal guideways for the skid rails of a demountable body, a pair of bridges pivoted to the truck adjacent the ends of the guideways respectively and a pair of bumpers on the truck having portions which extend beneath and in vertical alignment with the respective bridges to support them during truck travel, combined with a supporting structure having thereon means for attaching the free ends of the bridges, the bumpers projecting such distance relative to the bridges that when the bumpers engage the supporting structure the bridges are thereby properly located relative to the attaching devices.

14. A truck adapted to carry a demountable body, a pair of pivotally mounted bridges projecting rearwardly from the truck, a continuous set of rollers for each bridge, a pair of bumper castings secured to the rear of said truck and pivotally supporting one end of said bridges respectively, means carried by the castings for supporting the free ends of said bridges while the truck is in transit, and means carried by the free ends of said bridges for attachment with bridge-supporting means on a railway car, said last mentioned means and the free ends of said bridges being spaced a predetermined distance from said car by said bumpers to permit ready attachment of said bridges with said bridge-supporting means and to prevent damage to said bridges when said truck is backed against said car.

15. A highway truck having a pair of parallel guideways extending lengthwise of the truck, said truck having a pair of bridges pivoted to it respectively adjacent the rear ends of the guideways, and adapted to be swung to idle and active positions and a pair of bumpers laterally spaced at the rear of the truck and projecting beyond the bridges when substantially in their active positions.

16. A truck adapted to carry a demountable body, such truck having a pair of parallel guideways for the body and a pair of bridges hinged to the truck, each bridge having a continuous set of rollers to provide rolling pathways to said guideways, and bracket means on the truck for supportingly engaging the bridges at their free ends when swung down to an inoperative position to support them during travel.

17. A truck having a guideway for a demountable body to be carried by the truck, a bridge pivoted to the truck adjacent the end of the guideway, said bridge having means adjacent its free end for effecting attachment of a cooperating platform to prevent outward movement of the truck, a rigid pumper carried by the truck and serving the double purpose of supporting the bridge during travel of the truck and of locating the bridge with reference to an attaching device associated with the platform when the bumper engages an abutment associated with the platform.

18. A truck adapted to carry a demountable body having at the rear end thereof two castings spaced apart, each casting carrying two shafts connected by spur gears, a transverse shaft geared with one of the shafts of each casting; means for driving the transverse shaft; bails pivoted respectively on the other shaft of each casting; rollers carried by said bails, and means for attaching the bails to a platform adapted to receive the body from the truck across the bails.

19. A truck adapted to carry a demountable body, a bridge pivotally attached to the truck and adapted to be connected at its free end to a support for said body, a bumper on the truck adapted to support the bridge in idle position during the travel of the truck combined with a body supporting platform having means for attaching the free end of the bridge, the bumper projecting such distance relative to the bridge that when the bumper engages an abutment associated with the platform the bridge is thereby located relative to the attaching device.

20. A truck having a pair of longitudinal guideways adapted to carry a demountable body, a pair of bridges pivotally attached to the truck at the rear end thereof and adapted to be connected at their free ends to an attaching device on a vehicle, bumpers on the truck adapted to support the bridges in idle position during the travel of the truck, combined with a vehicle having means for attaching the free ends of the bridges, each pumper projecting such distance relative to the bridge that when the bumper engages an abutment associated with the vehicle the bridge is thereby located relative to the attaching device on the vehicle.

21. A highway truck having a pair of guideways thereon for a demountable body, a bridge pivoted to the truck and adapted to be attached at its free end to a structure adapted to support the body, and a bumper protectively related to the bridge, carried by the truck and vertically underhanging a portion of the bridge in a manner to support it in one adjusted position thereof.

RAGNAR A. NORBOM.